United States Patent
Kobayashi et al.

(10) Patent No.: US 6,343,097 B2
(45) Date of Patent: *Jan. 29, 2002

(54) NOISE REDUCER, NOISE REDUCING THEREOF, PICTURE SIGNAL PROCESSING APPARATUS, AND MOTION DETECTING METHOD

(75) Inventors: Hiroshi Kobayashi, Kanagawa; Takao Takahashi, Tokyo; Toshiya Akiba, Kanagawa; Masami Tomita, Chiba, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,284

(22) Filed: Jun. 16, 1999

(30) Foreign Application Priority Data

Jun. 18, 1998 (JP) .............................. 10-171068

(51) Int. Cl.[7] ................................. H04N 7/12
(52) U.S. Cl. ...................................... 375/240
(58) Field of Search .............................. 348/416, 416.1; 382/168; 375/240, 240.12, 240.15, 240.24

(56) References Cited

U.S. PATENT DOCUMENTS

| | | | | |
|---|---|---|---|---|
| 5,028,996 A | * | 7/1991 | Takahashi et al. | 348/420 |
| 5,347,309 A | * | 9/1994 | Takahashi | 375/240.12 |
| 5,416,522 A | * | 5/1995 | Igarashi | 348/416 |
| 5,568,196 A | * | 10/1996 | Hamada et al. | 348/416 |
| 5,646,691 A | * | 7/1997 | Yokoyama | 348/416 |

* cited by examiner

*Primary Examiner*—Chris Kelley
*Assistant Examiner*—Allen Wong
(74) *Attorney, Agent, or Firm*—Frommer Lawrence & Haug LLP; William S. Frommer; Gordon Kessler

(57) ABSTRACT

A detecting circuit detects a moving vector for each block. Corresponding to the moving vectors, a plurality of moving portions in one field are extracted. Thus, a moving vector of each moving portion is generated. In a field memory, a motion compensating process is performed corresponding to the moving vectors. A field difference between the input signal and a signal that has been movement-compensated is supplied to an Hadamard transform circuit. The Hadamard transform circuit divides the field difference signal into a plurality of frequency components. A non-linear circuit has noise components corresponding to individual frequency bands. An output signal of the non-linear circuit is supplied to an inverse-Hadamard transform circuit. The inverse-Hadamard transform circuit performs an inverse-Hadamard transform process. The resultant signal is subtracted from the input picture signal.

4 Claims, 16 Drawing Sheets

(N-1)-TH FIELD (N-1)-TH FIELD

Fig. 9A

WEIGHTING COEFFICIENTS ASSIGNED TO MOVED BLOCK IN (N-1)-TH FIELD (AREA OF MOVING PORTION shown as hatched region)

| 1 | 1 | 1 | 0.5 | 0.5 | 0 | 0 | 0 |
| --- | --- | --- | --- | --- | --- | --- | --- |
| 1 | 1 | 1 | 0.5 | 0.5 | 0 | 0 | 0 |
| 1 | 1 | 1 | 0.5 | 0.5 | 0 | 0 | 0 |
| 1 | 1 | 1 | 1 | 0.5 | 0.5 | 0 | 0 |
| 1 | 1 | 1 | 0.5 | 0.5 | 0 | 0 | 0 |
| 1 | 1 | 0.5 | 0.5 | 0.5 | 0 | 0 | 0 |
| | 0.5 | 0.5 | 0.5 | 0 | 0 | 0 | 0 |
| | | 0.5 | 0.5 | 0 | 0 | 0 | 0 |

Fig. 9B

WEIGHTING COEFFICIENTS OF PICTURE IN (N-1)-TH FIELD

| 0.5 | 0.5 | 0 | 0 | 0 | 0 | 0 | 0 |
| --- | --- | --- | --- | --- | --- | --- | --- |
| 0.5 | 0.5 | 0.5 | 0 | 0 | 0 | 0 | 0 |
| 0.5 | 0.5 | 0.5 | 0.5 | 0.5 | 0.5 | 0.5 | 0.5 |
| 1 | 0.5 | 0.5 | 0.5 | 0.5 | 0.5 | 0.5 | 0.5 |
| 1 | 1 | 1 | 0.5 | 0.5 | 0.5 | 0.5 | 0.5 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Fig. 10A

WEIGHTING COEFFICIENTS ASSIGNED TO MOVED BLOCK IN (N−1)-TH FIELD

AREA OF MOVING PORTION

| | | | | | | | |
|---|---|---|---|---|---|---|---|
| 1 | 1 | 1 | 1 | 1 | 0.75 | 0.5 | 0.25 |
| 1 | 1 | 1 | 1 | 1 | 0.75 | 0.5 | 0.25 |
| 1 | 1 | 1 | 1 | 1 | 0.75 | 0.5 | 0.25 |
| 1 | 1 | 1 | 1 | 1 | 0.75 | 0.5 | 0.25 |
| 1 | 1 | 1 | 1 | 1 | 0.75 | 0.5 | 0.25 |
| 0.75 | 0.75 | 0.75 | 0.75 | 0.75 | 0.75 | 0.5 | 0.25 |
| 0.5 | 0.5 | 0.5 | 0.5 | 0.5 | 0.5 | 0.5 | 0.25 |
| 0.25 | 0.25 | 0.25 | 0.25 | 0.25 | 0.25 | 0.25 | 0.25 |

Fig. 10B

WEIGHTING COEFFICIENTS ON PICTURE IN (N−1)-TH FIELD

| | | | | | | | | | |
|---|---|---|---|---|---|---|---|---|---|
| | | 1 | 1 | 1 | 1 | 1 | 1 | 1 | 1 |
| | | 1 | 1 | 1 | 1 | 1 | 1 | 1 | 1 |
| | | 0.75 | 0.75 | 0.75 | 0.75 | 0.75 | 0.75 | 0.75 | |
| 1 | 1 | 0.5 | 0.5 | 0.5 | 0.5 | 0.5 | 0.5 | 0.5 | 0.75 |
| 1 | 1 | 0.25 | 0.25 | 0.25 | 0.25 | 0.25 | 0.25 | 0.5 | 0.75 |
| 1 | 1 | 0 | 0 | 0 | 0 | 0 | 0.25 | 0.5 | 0.75 |
| 1 | 1 | 0 | 0 | 0 | 0 | 0 | 0.25 | 0.5 | 0.75 |
| 1 | 1 | 0 | 0 | 0 | 0 | 0 | 0.25 | 0.5 | 0.75 |
| 1 | 1 | 0 | 0 | 0 | 0 | 0 | 0.25 | 0.5 | 0.75 |
| 1 | 1 | 0 | 0 | 0 | 0 | 0 | 0.25 | 0.5 | 0.75 |

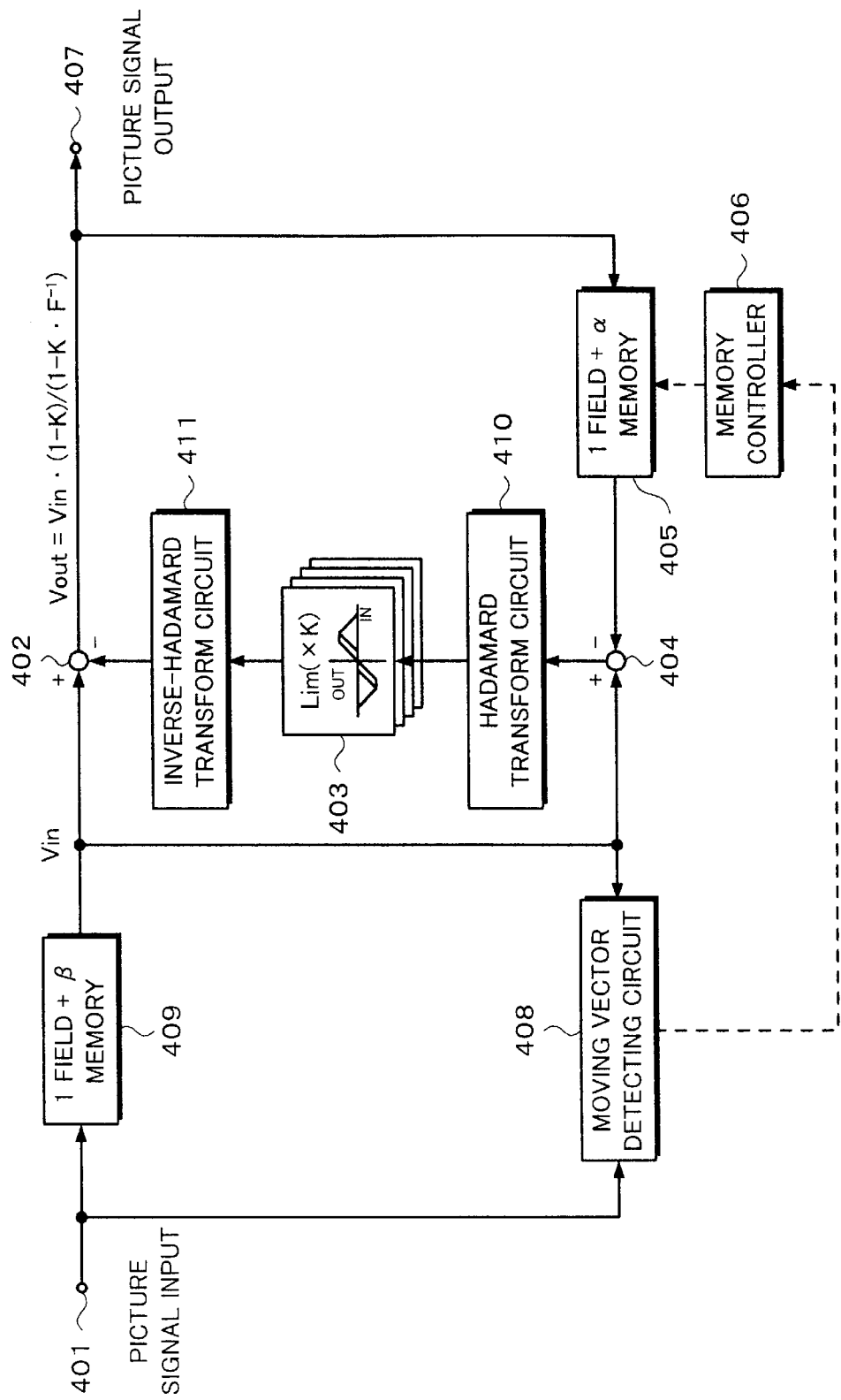

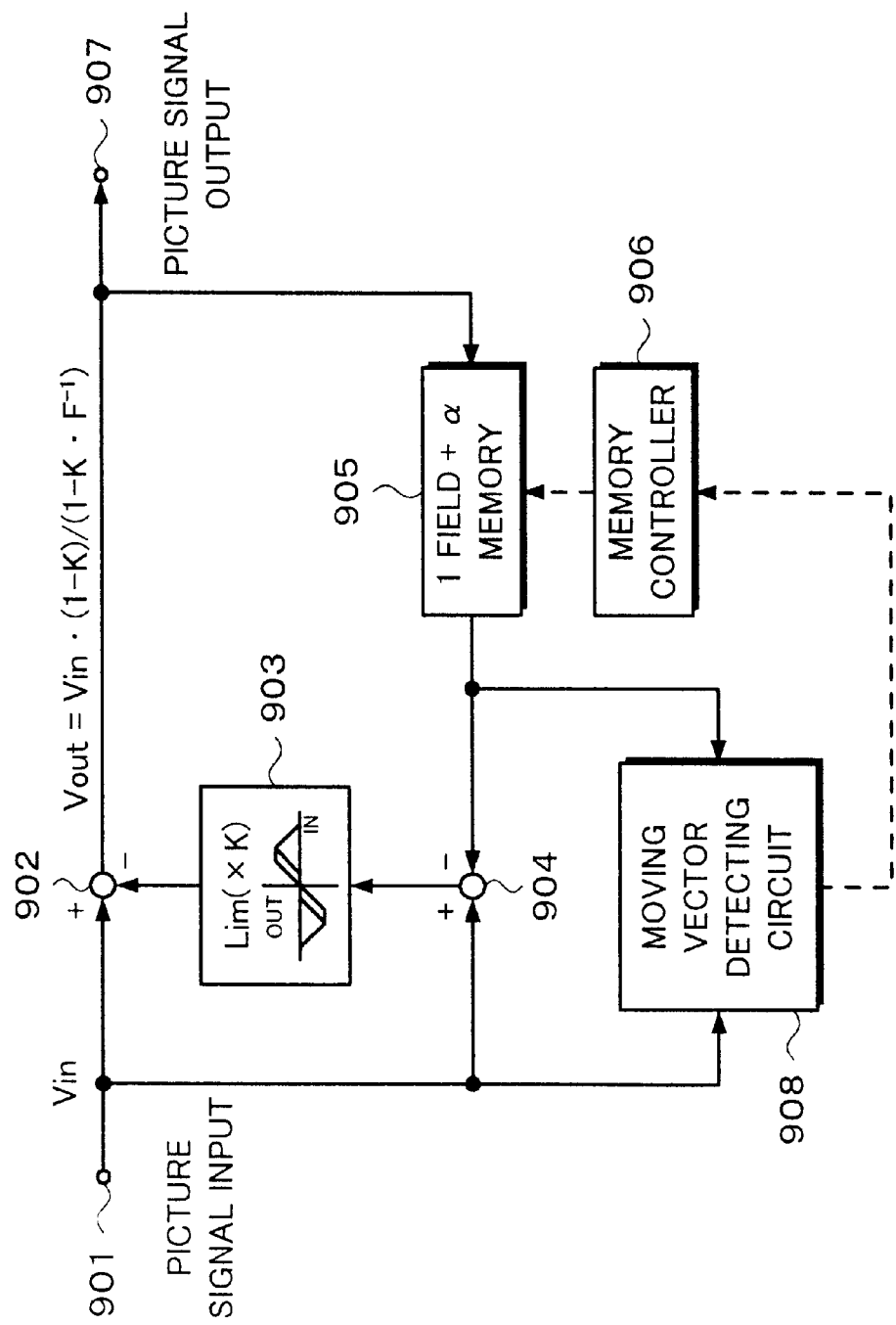

NOISE REDUCER, NOISE REDUCING THEREOF, PICTURE SIGNAL PROCESSING APPARATUS, AND MOTION DETECTING METHOD

BACKGROUND OF THE INVENTION

1. Field of the Invention

The present invention relats to a recursive noise reducer for reducing a noise of a digital video signal and to a noise reducing method thereof. The present invention also relates to a noise reducer, a noise reducing method, a picture signal processing apparatus, and a motion detecting method suitable for recording/reproducing a picture to/from a record medium such as an optical disc or a magnetic tape and for transmitting a picture from a transmitting side to a receiving side through a transmission path in a television conference system, a television telephone system, a broadcasting unit, and so forth.

2. Description of the Related Art

A recursive noise reducer using a frame memory has been well known in the field of digital picture signal process. The recursive noise reducer obtains the differences between an input video signal and a video signal of one frame prior received from the frame memory, extracts portions having small levels from the differences as noise components, and subtracts the extracted noise components from the input video signal. Thus, the recursive noise reducer reduces the noise of the input video signal and writes the resultant video signal to the frame memory. When a field memory is used instead of the frame memory, the capacitance of the memory can be decreased.

FIG. 1 is a block diagram showing an example of the structure of a conventional noise reducer. An input video signal that has been converted into a digital signal (referred to as input video signal Vin) is received from an input terminal 201. The input video signal Vin is supplied to subtracting devices 202 and 204. An output signal of the subtracting device 202 is obtained from an output terminal 207. In addition, the output signal of the subtracting device 202 is written to a frame memory 205. A memory controller 206 is disposed corresponding to the frame memory 205. The memory controller 206 controls a writing operation and a reading operation of the frame memory 205. The read data of the frame memory 205 is delayed by one frame against the write data. An output signal of the frame memory 205 is denoted by Vout. One frame delay is denoted by $F^{-1}$. Thus, the output signal Vout·$F^{-1}$ of the frame memory 205 is supplied to the subtracting device 204. Since the input picture signal Vin is supplied to the subtracting device 204, the subtracting device 204 generates a frame difference.

The output signal of the subtracting device 204 is supplied to the subtracting device 202 through a non-linear circuit 203. The non-linear circuit 203 multiplies the output signal of the subtracting device 204 by feed-back coefficient K corresponding to the level of the input picture signal. The non-linear circuit 203 is composed of a ROM. As input/output characteristics of the non-linear circuit 203, when the level of the input signal (frame difference) is small, feed-back coefficient K=1 is set and the input signal is output as a noise component. When the level of the input signal is intermediate, the level of the output signal is limited to a predetermined value. When the level of the input signal is large, the output signal is decreased. When the level of the input signal is much large, assuming that a frame difference takes place due to a motion, the level of the output signal is 0.

Thus, using the characteristics of which the inter-frame correlation and the amplitude of a noise component are small, the non-linear circuit 203 extracts the noise component. The subtracting device 202 subtracts the extracted noise component from the input video signal. Thus, the noise can be reduced.

The output video signal Vout can be expressed by the following formula.

$$Vout = Vin - K \cdot (Vin - Vout \cdot F^{-1}) = Vin \cdot (1-K)/(1-K \cdot F^{-1}) \quad (1)$$

In the above-described noise reducer, when there is a moving portion on a picture, the inter-frame correlation is lost. Thus, since it becomes difficult to distinguish a noise from an input signal, a moving blur takes place. To solve such a problem, a noise reducer (for example, Japanese Patent Laid-Open Publication No. 7-15630) has been proposed. In the noise reducer, an inter-frame or inter-field moving vector in a particular direction of the entire picture is detected. The delay amount of the memory is controlled corresponding to the amount of movement.

In addition, a method for improving the prediction accuracy of the motion compensation of an encoder (for example, Japanese Patent Laid-Open Publication No. 6-296278) has been proposed. In the method, a pre-processing apparatus of a motion compensation prediction encoding apparatus performs a motion compensation predicting process for an input picture that has a large moving portion and contains many random noise components.

In the noise reducer (Japanese Patent Laid-Open Publication No. 7-15630), which performs the motion compensating process, although a moving blur due to a parallel movement of a whole picture can be alleviated, a moving blue due to a plurality of moving portions on a picture cannot be alleviated.

On the other hand, in the method (Japanese Patent Laid-Open Publication No. 6-296276), since the motion compensating process is performed block by block, a block distortion of which the boundary of a block is conspicuous on a decoded picture takes place. In addition, to obtain an inter-frame moving vector, a frame memory is required. Thus, the cost of the apparatus increases.

OBJECTS AND SUMMARY OF THE INVENTION

Therefore, an object of the present invention is to provide a noise reducer, a noise reducing method, and a picture signal processing apparatus for suppressing a moving blur without a block distortion even if a plurality of moving portions take place on a picture.

Another object of the present invention is to provide a noise reducer, a noise reducing method, and a picture processing apparatus for dividing an interfield difference or an inter-frame difference into a plurality of frequency components so as to properly reduce noise.

A further object of the present invention is to provide a motion detecting method for detecting an inter-field motion or an inter-frame motion for each of a plurality of moving portions.

A first aspect of the present invention is a noise reducer, comprising a moving vector detecting means for dividing a picture signal into a plurality of blocks and detecting moving vectors of the blocks between adjacent fields or adjacent frames, a motion compensating means for extracting a moving portion of a picture of one field prior or one frame prior corresponding to the moving vectors and compensating the motion of the extracted moving portion corresponding to the moving vectors, a difference signal obtaining means for obtaining a difference signal between the picture signal and a signal that has been motion-compensated of one field prior or one frame prior, a non-linear process means for performing a non-linear process for the difference signal, and a combining means for combining the picture signal and the signal that has been non-linear-processed.

A second aspect of the present invention is a noise reducer, comprising a moving vector detecting means for dividing a picture signal into a plurality of blocks and detecting moving vectors of the blocks between adjacent fields or adjacent frames, a motion compensating means for compensating the motion of a picture of one frame prior or one field prior with the moving vectors, a difference signal obtaining means for obtaining a difference signal between the picture signal and a signal that has been motion-compensated of one field prior or one frame prior, a dividing means for dividing the difference signal into a plurality of frequency component difference signals, a non-linear process means for performing a non-linear process for the individual frequency component difference signals, and a combining means for combining the picture signal and the frequency component signals that have been non-linear-processed.

A third aspect of the present invention is a picture signal processing apparatus for compression-encoding a picture signal, comprising a noise reducer for reducing a noise of a picture signal that has not been compression-encoded, wherein the noise reducer comprises a moving vector detecting means for dividing a picture signal into a plurality of blocks and detecting moving vectors of the blocks between adjacent fields or adjacent frames, a motion compensating means for extracting a moving portion of a picture of one field prior or one frame prior corresponding to the moving vectors and compensating the motion of the extracted moving portion corresponding to the moving vectors, a difference signal obtaining means for obtaining a difference signal between the picture signal and a signal that has been motion-compensated of one field prior or one frame prior, a non-linear process means for performing a non-linear process for the difference signal, and a combining means for combining the picture signal and the signal that has been non-linear-processed.

A fourth aspect of the present invention is a picture signal processing apparatus for compression-encoding a picture signal, comprising a noise reducer for reducing a noise of a picture signal that has not been compression-encoded, wherein the noise reducer comprises a moving vector detecting means for dividing a picture signal into a plurality of blocks and detecting moving vectors of the blocks between adjacent fields or adjacent frames, a motion compensating means for compensating the motion of a picture of one frame prior or one field prior with the moving vectors, a difference signal obtaining means for obtaining a difference signal between the picture signal and a signal that has been motion-compensated of one field prior or one frame prior, a dividing means for dividing the difference signal into a plurality of frequency component difference signals, a non-linear process means for performing a non-linear process for the individual frequency component difference signals, and a combining means for combining the picture signal and the frequency component signals that have been non-linear-processed.

A fifth aspect of the present invention is a motion detecting method for dividing a picture signal into a plurality of blocks and detecting a motion between adjacent fields or adjacent frames of the picture signal, the method comprising the steps of detecting moving vectors of the individual blocks between adjacent fields and adjacent frames, obtaining the histogram of the moving vectors for one field or one frame, arranging the moving vectors in the order of higher frequencies of the histogram, and obtaining at least one moving vector with the highest frequency (frequencies), and detecting a block having a moving vector with the highest frequency as a moving portion.

According to the present invention (first aspect and so forth), a recursive noise reducer preforms a motion compensating process. Thus, a plurality of moving portions can be detected on a picture. By detecting moving vectors of the moving portions, a motion compensating process can be performed for each moving portion. Thus, the moving blur of the apparatus according to the present invention is smaller than the moving blur of an apparatus that equally performs a motion compensating process for a whole picture. According to the present invention (third aspect), since such a noise reducer is disposed upstream of a circuit that preforms a compression-encoding process, the efficiency of the compression-encoding process can be improved.

According to the present invention (second and so forth), an inter-field difference or an inter-frame difference is divided into a plurality of frequency components. A non-linear process is performed for each of the frequency components. Thus, in consideration of the conspicuousness of noise components corresponding to the frequency components, the noise components can be effectively reduced. According to the present invention (fifth aspect), the motions of a plurality of moving portions on a picture can be detected corresponding to moving vectors detected for individual blocks.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 9A and 9B are schematic diagrams for explaining an example of weighting coefficients in the motion compensating process;

FIGS. 10A and 10B are schematic diagrams for explaining another example of weighting coefficients in the motion compensating process;

FIG. 11 is a block diagram showing the structure of a noise reducer according to a second embodiment of the present invention;

FIG. 16 is a block diagram showing the structure of a noise reducer according to a sixth embodiment of the present invention.

DETAILED DESCRIPTION OF THE PREFERRED EMBODIMENTS

Next, with reference to the accompanying drawings, an embodiment of the present invention will be described. First of all, with reference to FIG. 2, an example of an optical disc recording/reproducing apparatus according to the present invention will be described.

Figure 2:
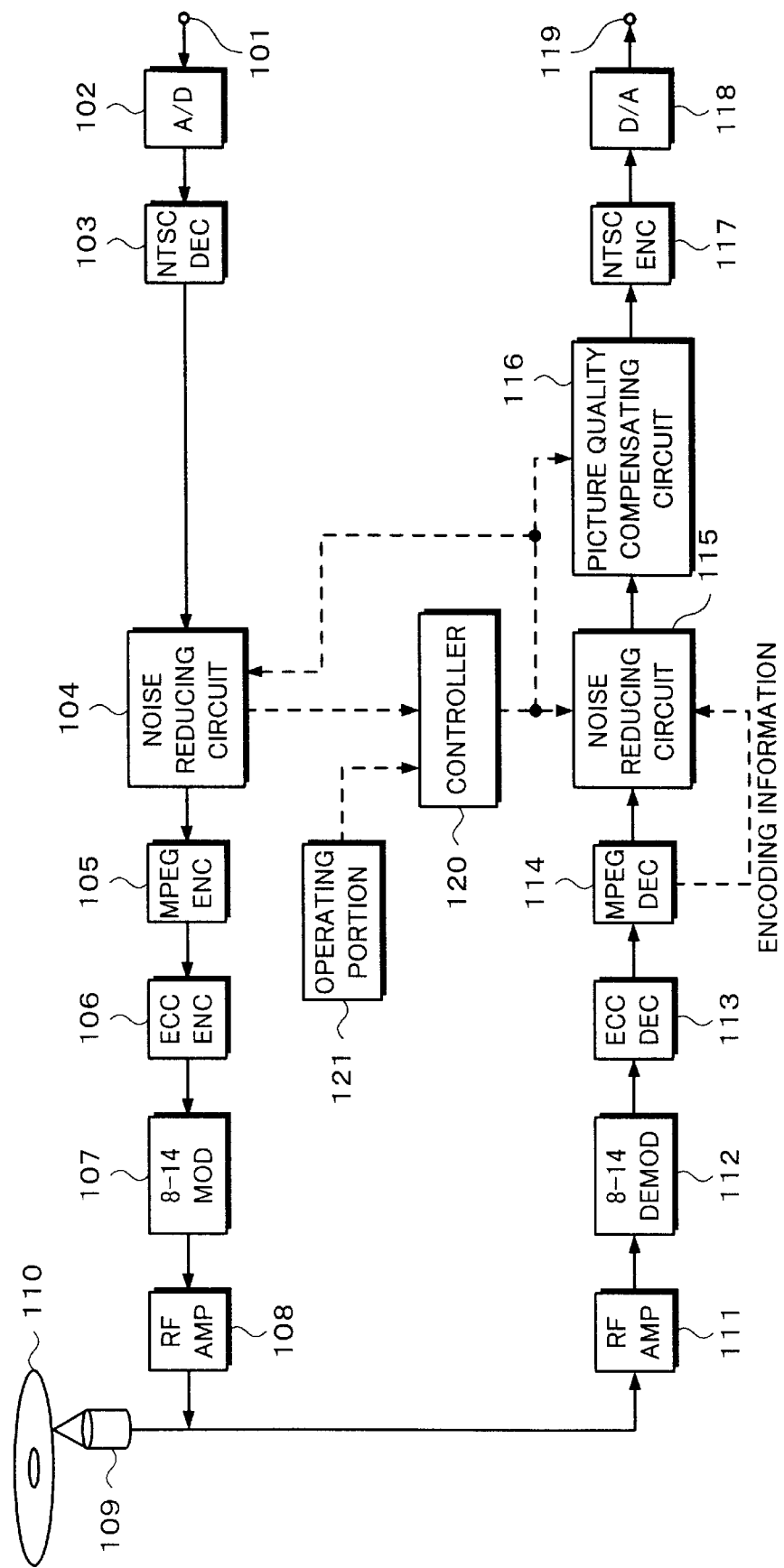
FIG. 2 is a block diagram showing an example of a recording/reproducing apparatus according to the present invention.

In FIG. 2, reference numeral 1 is an optical disc recording/reproducing apparatus. A recording system of the optical disc recording/reproducing apparatus 1 comprises an A/D converting circuit 102, an NTSC (National Television System Committee) decoder 103, a noise reducing circuit 104, an MPEG (Moving Picture Experts Group) encoder 105, an ECC (Error Correction Codes) encoder 106, an 8-14 modulating circuit 107, and an RF amplifier 108. A picture signal is received from an input terminal 101 and supplied to the A/D converting circuit 102. Picture data that is received from the A/D converting circuit 102 is supplied to the NTSC decoder 103. A picture that is received from the NTSC decoder 103 is supplied to the noise reducing circuit 104. Picture data that is received from the noise reducing circuit 104 is supplied to the MPEG encoder 105. Picture data that is received from the MPEG encoder 105 is supplied to the ECC encoder 106. Picture data that is received from the ECC encoder 106 is supplied to the 8-14 modulating circuit 107 Picture data that is received from the 8-14 modulating circuit 107 is supplied to the RF amplifier 108.

An NTSC picture signal that is received from the input terminal 101 is supplied to the A/D converting circuit 102. The A/D converting circuit 102 converts the NTSC picture signal that is an analog signal into a digital picture signal. The A/D converting circuit 102 supplies the digital picture signal to the NTSC decoder 103.

The NTSC picture signal received from the A/D converting circuit 102 is supplied to the NTSC decoder 103. The NTSC decoder 103 decodes the NTSC picture signal as a composite signal. Thus, the NTSC decoder 103 converts the picture data into base band signals (luminance signal, R-Y signal, and B-Y signal). The NTSC decoder 103 outputs picture data to the MPEG encoder 105.

The picture data received from the NTSC decoder 103 is supplied to the noise reducing circuit 104. The noise reducing circuit 104 reduces random noise components contained in the input picture signal. Since the noise reducing circuit 104 reduces the noise components, the picture compressing efficiency of the MPEG encoder 105 disposed downstream of the noise reducing circuit 104 improves. In addition, the predicting accuracy of the motion compensating process improves. The noise reducing process may be performed for all component signals or only the luminance signal. The noise reducing circuit 104 performs a filtering process for the picture data received from the NTSC decoder 103 so as to reduce the noise components. The noise reducing circuit 105 is connected to a controlling circuit 120. Thus, the noise reducing circuit 105 operates corresponding to a control signal received from the controlling circuit 120. The controlling circuit 120 is composed of a microcomputer. The noise reducing circuit 104 outputs picture data to the MPEG encoder 105.

The MPEG encoder 105 performs a motion compensation inter-frame prediction encoding process for the picture data received from the noise reducing circuit 104. In addition, the MPEG encoder 105 performs a block DCT (Discrete Cosine Transform) encoding process for a predicted error. The MPEG encoder 105 performs an encoding process for the picture data and outputs MPEG picture data. At this point, the MPEG encoder 105 adds encoding information such as a quantizing scale to picture data and outputs a bit stream thereof. The MPEG encoder 105 supplies the picture data to the ECC encoder 106.

The ECC encoder 106 adds redundancy code as an error correction code to the bit stream received from the MPEG encoder 105. The ECC encoder 106 supplies the resultant bit stream to the 8-14 modulating circuit 107.

The 8-14 modulating circuit 107 performs an 8-14 modulating process for the bit stream received from the ECC encoder 106. In other words, the 8-14 modulating circuit 107 converts an eight-bit code into a 14-bit code so as to decrease low frequency components of the record signal. The 8-14 modulating circuit 107 supplies the resultant bit stream to the RF amplifier 108. The RF amplifier 108 amplifies the bit stream received from the 8-14 modulating circuit 107 and supplies the resultant signal to an optical pickup 109.

The recording system of the optical disc recording/reproducing apparatus 1 records the bit stream of a picture to an optical disc 110 through the optical pickup 109. The optical disc 110 is a recordable disc that is for example a magneto-optical disc or a phase change type disc.

A reproducing system of the optical disc recording/reproducing apparatus 1 comprises an RF amplifier 111, a 8-14 demodulating circuit 112, an ECC decoder 113, an MPEG decoder 114, a noise reducing circuit 115, a picture quality compensating circuit 116, an NTSC encoder 117, and a D/A converting circuit 118. Picture data recorded on the optical disc 110 is supplied to the RF amplifier 111 through the optical pickup 109. Picture data that is received from the RF amplifier 111 is supplied to the 8-14 demodulating circuit 112. Picture data that is received from the 8-14 demodulating circuit 112 is supplied to the ECC decoder 113. Picture data that is received from the ECC decoder 113 is supplied to the MPEG decoder 114. Picture data that is received from the MPEG decoder 114 is supplied to the noise reducing circuit 115. Picture data whose noise has been reduced by the noise reducing circuit 115 is supplied to the picture quality compensating circuit 116. Picture data whose picture quality has been compensated by the picture quality compensating circuit 116 is supplied to the NTSC encoder 117. NTSC picture data received from the NTSC encoder 117 is supplied to the D/A converting circuit 118.

The RF amplifier 111 amplifies the picture data detected by the optical pickup 109 from the optical disc 110. In addition, the RF amplifier 111 generates a tracking error signal and a focus error signal (not shown) so as to perform a tracking servo process and a focus servo process, respectively. The tracking error signal and the focus servo signal are supplied to the servo circuit. The RF amplifier 111 supplies the amplified picture data to the 8-14 demodulating circuit 112.

The 8-14 demodulating circuit 112 performs an 8-14 demodulating process for the picture data received from the RF amplifier 111. The 8-14 demodulating circuit 112 converts a 14-bit code into an eight-bit code unlike with the 8-14 modulating circuit of the recording system. The 8-14 demodulating circuit 112 supplies the demodulated picture data to the ECC decoder 113.

The ECC decoder 113 decodes the picture data received from the 8-14 demodulating circuit 112. In other words, the ECC decoder 113 detects an error from the reproduced data and corrects a correctable error. The ECC decoder 113 supplies the error-corrected picture data to the MPEG decoder 114. The MPEG decoder 114 decodes MPEG data and outputs base band signals. The MPEG decoder 114 supplies the base band signals to the noise reducing circuit 115.

The noise reducing circuit performs a filtering process for the picture data received from the MPEG decoder 114 so as to reduce noise components. Thus, the noise reducing circuit 115 reduces mosquito noise and block distortion that take place in the decoding process of the MPEG decoder 114. The noise reducing circuit 115 is connected to the controlling circuit 120. The noise reducing circuit 115 is controlled corresponding to a control signal received from the controlling circuit 120. The noise reducing circuit 115 supplies the noise-reduced picture data to the picture quality compensating circuit 116.

The picture quality compensating circuit 116 performs a picture quality compensating process for the picture data received from the noise reducing circuit 115. The picture quality compensating circuit 116 performs for example a contour compensating process as a picture quality compensating process. The picture quality compensating circuit 116 is connected to the controlling circuit 120 (that will be described later). The picture quality compensating circuit 116 is controlled corresponding to a control signal received from the controlling circuit 120. The picture quality compensating circuit 116 supplies the resultant picture data to the NTSC encoder 117.

The NTSC encoder 117 performs a process for adding a synchronous signal to picture data received from the picture quality compensating circuit 116 and a process for modulating color difference signals. The NTSC encoder 117 encodes picture data and outputs an NTSC composite picture signal. The NTSC encoder 117 supplies the NTSC composite picture signal to the D/A converting circuit 118.

The D/A converting circuit 118 converts the picture data as a digital signal received from the NTSC encoder 117 into an analog signal. In other words, the D/A converting circuit 118 converts the picture signal received from the NTSC encoder 117 into an analog NTSC composite picture signal. The D/A converting circuit 118 supplies the resultant analog picture signal to the output terminal 119.

In association with the controlling circuit 120 that supplies the control signal to the noise reducing circuit 104, the noise reducing circuit 115, and the picture quality compensating circuit 116, an operation input portion 121 is disposed. When the user inputs data to operation input portion 121, a signal corresponding to the input data is supplied to the controlling circuit 120.

The controlling circuit 120 is composed of for example a microcomputer or the like. The controlling circuit 120 supplies the control signal to the noise reducing circuit 104, the noise reducing circuit 115, and the picture quality compensating circuit 116. The controlling circuit 120 supplies a control signal to the noise reducing circuit 115 so as to reduce for example a block distortion corresponding to the signal received from the operation input portion 121. In addition, the controlling circuit 120 supplies control signals to the picture quality compensating circuit 116 so as to perform a picture quality compensating process and designate the level thereof.

When the user turns on/off the block distortion reducing function, he or she presses a predetermined switch of the operation input portion 121. Thus, the operation input portion 121 generates and outputs a relevant control signal to the controlling circuit 120. The operation input portion 121 also has a switch that allows the user to select the level of the picture quality compensating process. When the user presses the relevant switch of the operation input portion 121, it generates and outputs a relevant signal to the controlling circuit 120.

The present invention is applied to the noise reducing circuit 104 of the above-described recoding/reproducing apparatus. Likewise, the present invention can be applied to the noise reducing circuit 115. In addition, the present invention can be applied to a recoding/reproducing apparatus using other than an optical disc. Moreover, the present invention can be applied to a system that communicates picture data with a remote system.

Figure 3:
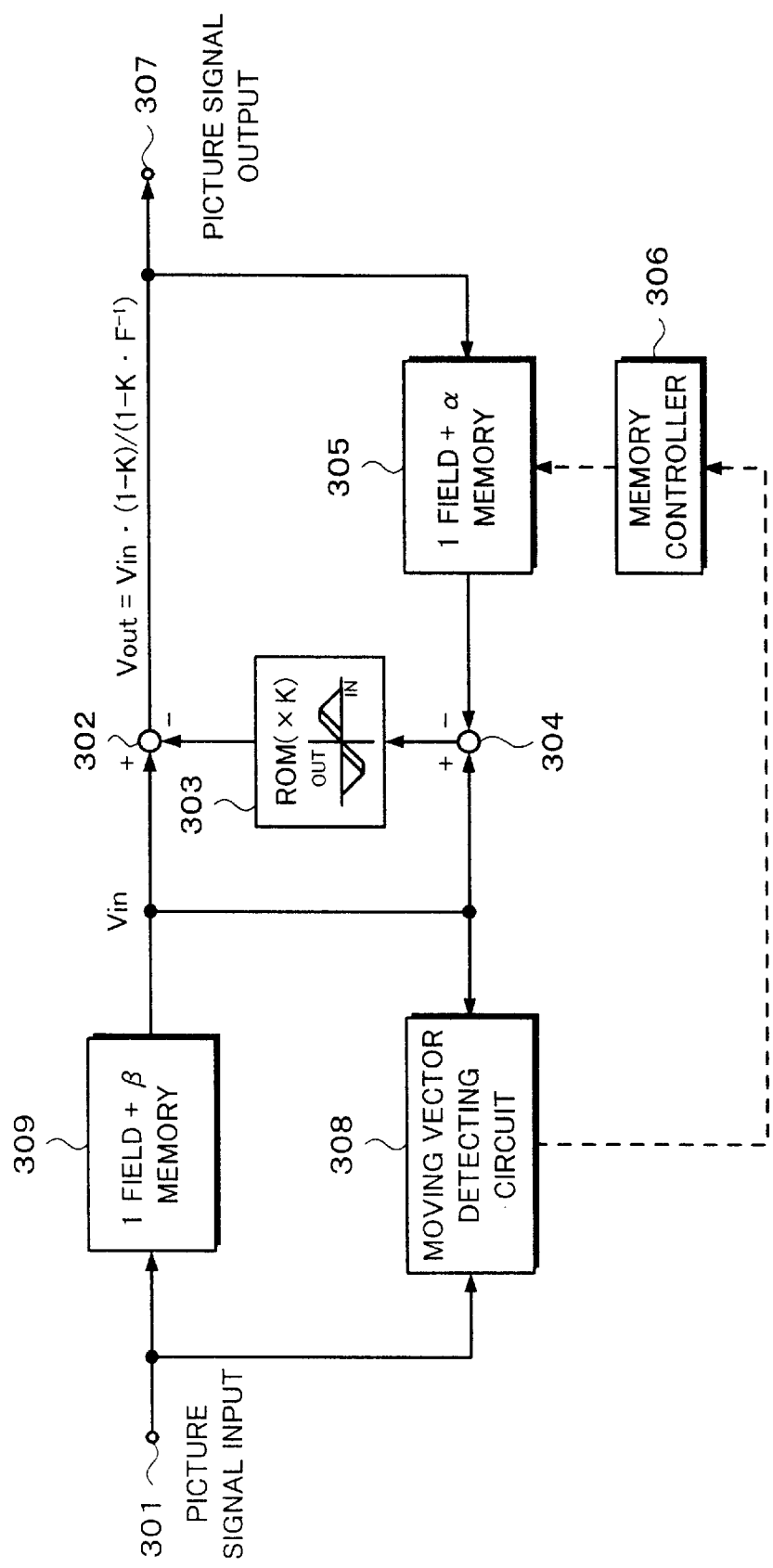
FIG. 3 is a block diagram showing the structure of a noise reducer according to a first embodiment of the present invention.

FIG. 3 shows the structure of a motion adaptive noise reducing circuit according to a first embodiment of the present invention. In the first embodiment, a moving vector detecting circuit 308 and a field memory 309 that perform a motion adaptive process are disposed in the noise reducing circuit shown in FIG. 1. In addition, a field memory 305 is used instead of the frame memory 205 (shown in FIG. 1). Since the motion compensating process is performed, a moving blur can be prevented. In addition, since the field memory is used, the cost can be reduced in comparison with the structure using the frame memory. The motion compensating process is performed for each of a plurality of moving portions that are extracted from a picture.

A picture signal that is received from a terminal 301 is written to the field memory 309. In addition, the picture signal is also supplied to a moving vector detecting circuit 308. The moving vector detecting circuit 308 matches blocks in a predetermined search range with the picture signal received from the terminal 301 and a picture signal delayed for one field by the field memory 309 and obtains moving vectors for individual blocks. The minimum unit (accuracy) of each moving vector is for example one pixel. In the case of an interlace-scanned picture signal, signals that are on the same line of adjacent fields are generated and block-matched so as to detect a moving portion between the adjacent fields. The moving vectors may be detected by other than the block matching method.

Each moving vector obtained from the moving vector detecting circuit 308 is supplied to a memory controller 306. When each moving vector is output as a motion compensation control signal from the memory controller 306, the moving vector is delayed by around one field. To compensate the delay of each moving vector, the picture signal that is received from the terminal 301 is delayed for around one field by the field memory 309. Corresponding to the picture signal delayed for around one field, the motion-compensated picture signal is read from the field memory 305. A subtracting device 304 inputs the delayed picture signal and the picture signal received from the field memory 305 and outputs a field difference signal.

The field difference signal is extracted as a noise by a non-linear circuit 303. The subtracting device 302 subtracts the extracted noise from the input picture signal. In such a manner, the field recursive noise reducing circuit 104 shown in FIG. 2 is accomplished. Depending on the polarities of the input picture signal and the output signal of the non-linear circuit 303, an adding device may be used instead of the subtracting device 302. The noise-reduced picture signal is supplied to a terminal 307. As with the prior art reference, the output video signal Vout can be expressed by formula (1). The non-linear circuit 303 can randomly select two types of feedback coefficients K (input/output characteristics). Thus, when the frame difference is small (namely, feedback coefficient K=1.0), the problem of which low order bits of output signal Vout do not change can be solved.

Figure 4:
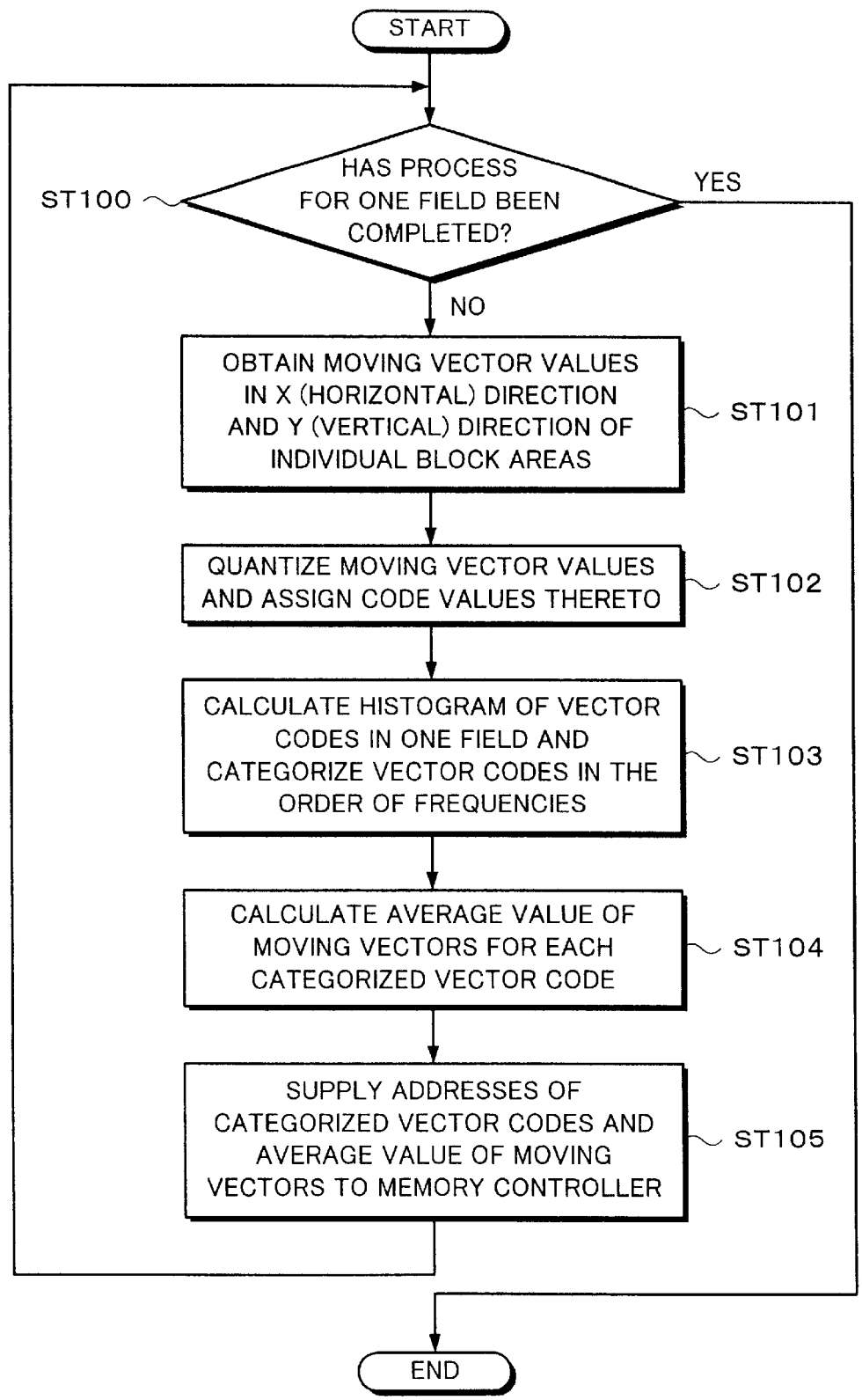
FIG. 4 is a flow chart showing a motion detecting process.

Next, with reference to a flow chart shown in FIG. 4, a method for obtaining a valid moving vector will be described. The valid moving vector is obtained using moving vectors of individual blocks by the moving vector detecting circuit 308. At step ST100, it is determined whether or not the process for one field has been completed. When the determined result at step ST100 is No, the flow advances to step ST101. At step ST101, moving vector values in X (horizontal) direction and Y (vertical) direction of individual blocks are obtained. The accuracy of each moving vector is for example one pixel.

At step ST102, the moving vector values obtained at step ST101 are coarsely quantized and representative values of the vectors are obtained. The representative values of the vectors are assigned codes.

AT step ST103, the histogram of codes of vectors in one field is calculated. Thus, motions on the picture can be categorized. For example, the motions on the picture can be categorized as codes with the highest frequency, the second highest frequency, the third highest frequency, and other frequencies. With the codes having the three highest frequencies, a moving portion can be extracted.

At step ST104, with vector codes having the three highest frequencies obtained at step ST103, the average value of the moving vectors obtained at step ST101 is obtained.

At step ST105, addresses of blocks categorized as codes with the three highest frequencies and the average value of the moving vectors are supplied to the memory controller 306. The memory controller 306 controls the field memory 305 so that only moving portions that have extracted are motion-compensated corresponding to the average value of the moving vectors.

Figure 5A:
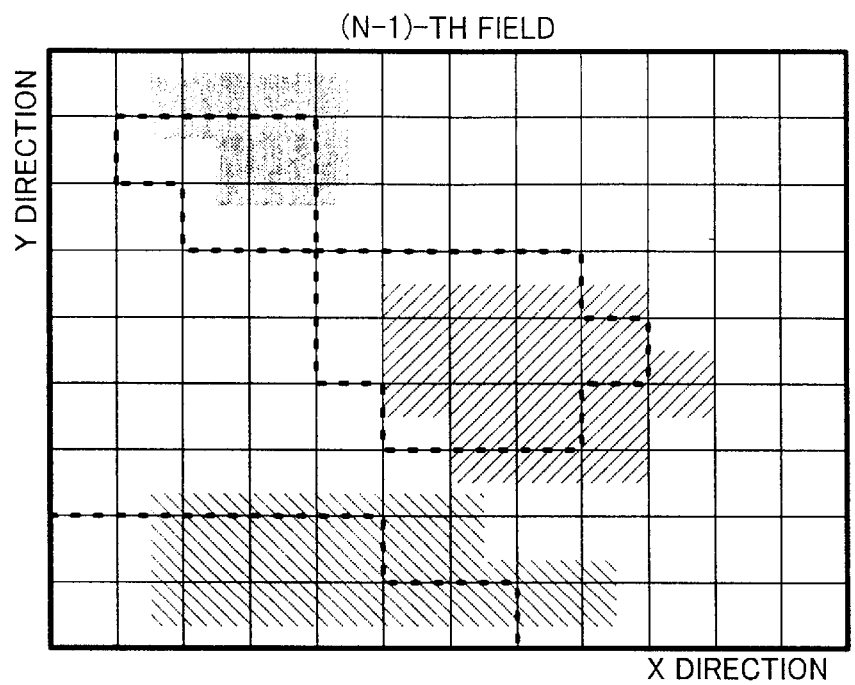
FIGS. 5A and 5B are schematic diagrams for explaining an outline of the motion compensating process.
Figure 5B:
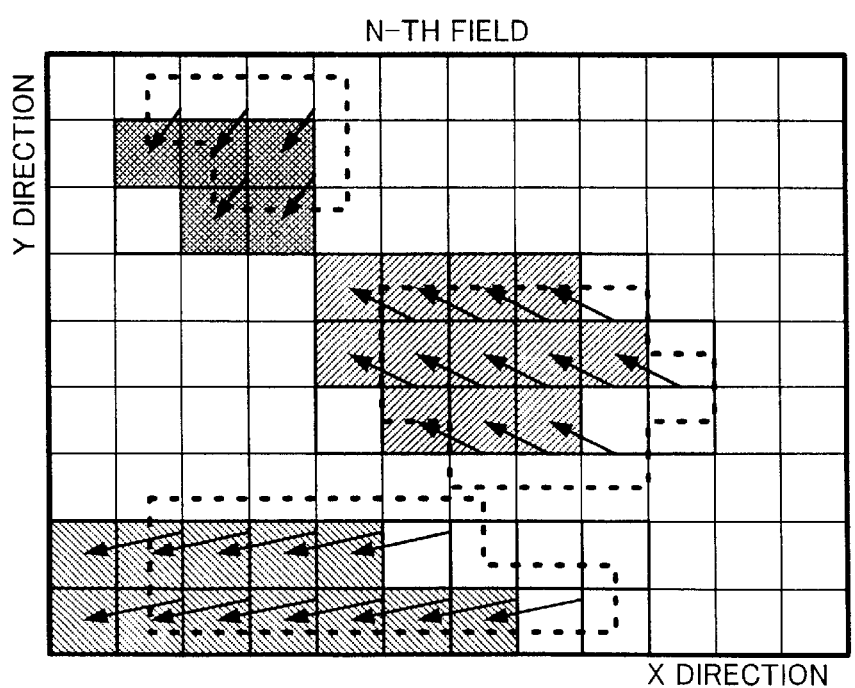

Next, a movement compensating method using the addresses of the blocks and the average value of the moving vectors will be described in detail. FIGS. 5A and 5B show motions between the (N−1)-th field (see FIG. 5A) and the N-th field (see FIG. 5B) that are chronologically successive. Each field is divided into blocks. A moving vector of each block is obtained by a block-matching process. In FIGS. 5A and 5B, hatched or shaded areas are blocks having vector codes with the three highest frequencies of the histogram. In FIGS. 5A and 5B, arrows represent quantized moving vectors of individual blocks.

Figure 6A:
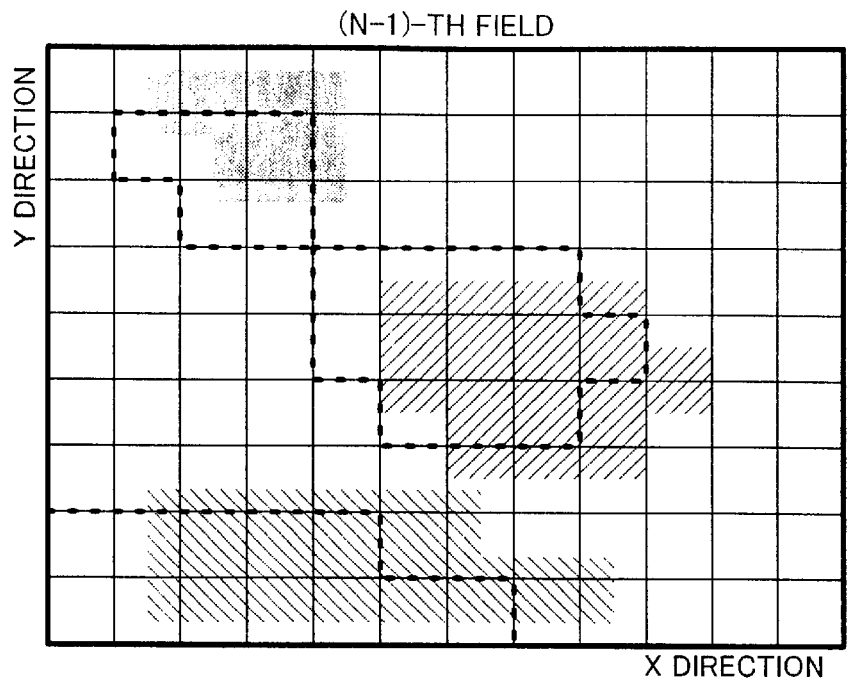
FIGS. 6A and 6B are schematic diagrams for explaining an example of the motion compensating process.
Figure 6B:
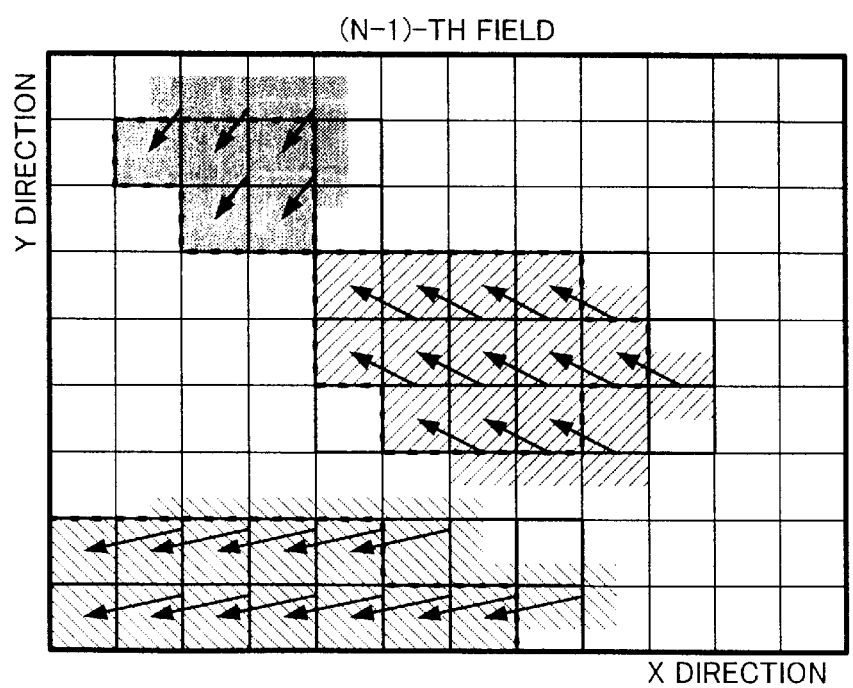

The memory controller 306 moves blocks of the (N−1)-th field corresponding to the addresses of the categorized blocks and the average value of the moving vectors. FIGS. 6A and 6B show such a motion compensating process. In this case, particular blocks (namely, a moving portion) shown in FIG. 6A are overwritten to a picture of the original (N−1)-th field (stored in the field memory 305). FIG. 6B shows the overwritten result. In an area that newly appears in the N-th field (namely, a portion behind a hatched moving portion) as a result of the motion compensating process, pixels of the (N−1)-th field are used, not moved. Thus, the memory controlling process of the memory controller 306 becomes simple.

Figure 7A:
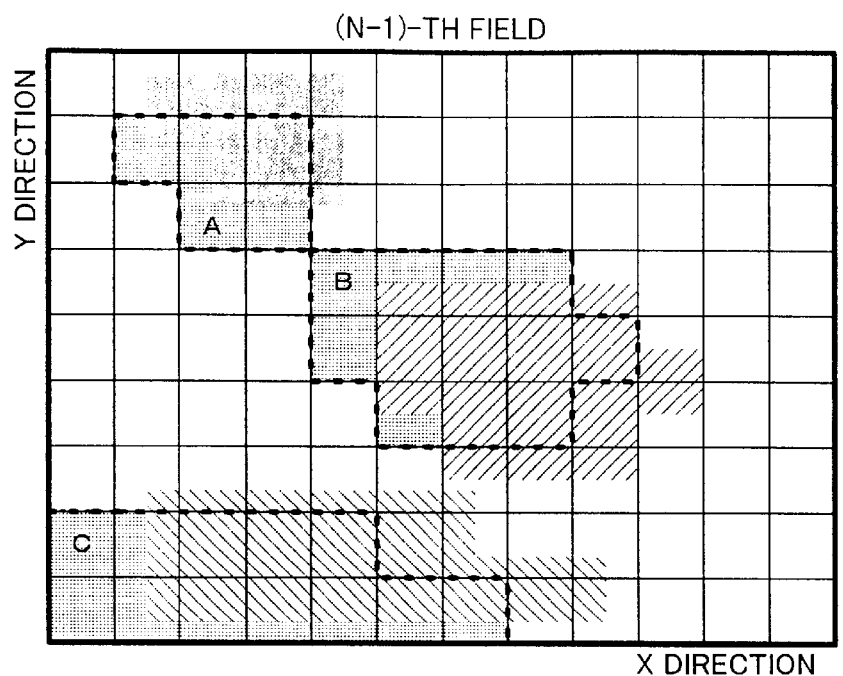
FIGS. 7A and 7B are schematic diagrams for explaining another example of the motion compensating process.
Figure 7B:
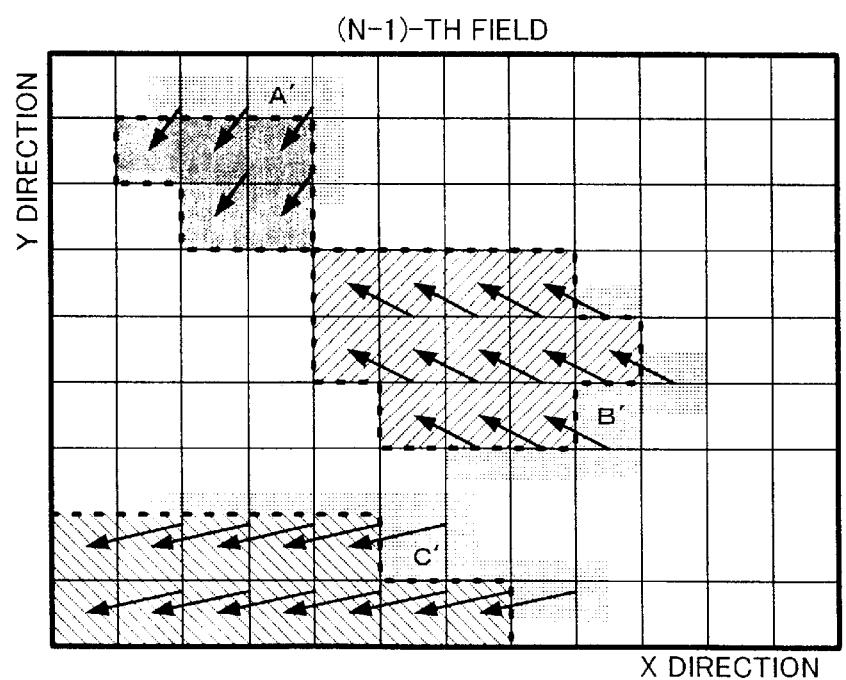

FIGS. 7A and 7B show another motion compensating method. In this method, as with the method shown in FIGS. 6A and 6B, the memory controller 306 moves blocks in the (N−1)-th field corresponding to the addresses of the categorized blocks and the average value of the moving vectors. However, in the motion compensating method shown in FIGS. 7A and 7B, an area that newly appears in the N-th field (a portion behind a moving portion in the (N−1)-th field) is processed in the following manner unlike with the method shown in FIGS. 6A and 6B. In the area that newly appears in the N-th field, pixels behind a moving portion in the N-th field are moved. In other words, in FIG. 7A, pixels of area A are rearranged and moved to area A' (see FIG. 7B) of the field that has been motion-compensated. Thus, an afterimage that takes place in a background portion can be alleviated. Likewise, pixels in areas B and C are moved to areas B' and C', respectively.

In the above-described motion compensating methods, since a moving portion is detected for each block, a block distortion may be conspicuous. Next, with reference to FIGS. 8A, 8B, 8C, and 8D, a motion compensating method that alleviates a block distortion will be described. In the motion compensating method shown in FIGS. 8A to 8D, a contour of a moving portion is extracted pixel by pixel.

Figure 8A:
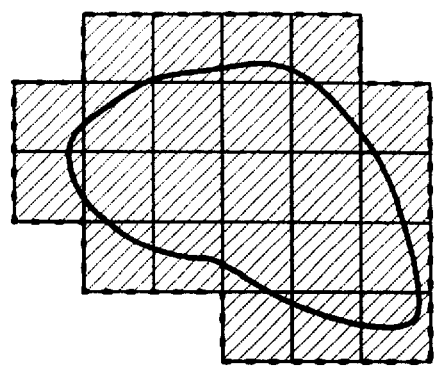
FIGS. 8A, 8B, 8C, and 8D are schematic diagrams for explaining a process for extracting a contour of a moving portion pixel by pixel.
Figure 8B:
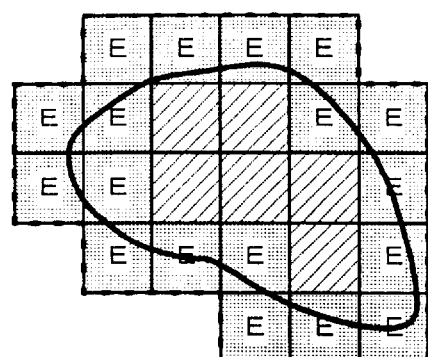

First of all, contour blocks of a moving portion with the same moving vector are observed. Blocks adjacent to blocks with other moving vectors are referred to as contour blocks. Hatched portions shown in FIG. 8A represent a moving portion detected block by block. The contour of a moving portion is represented by a solid line. FIG. 8B shows blocks adjacent to blocks with other moving vectors (namely, contour blocks E) . Edges of the contour blocks E are detected pixel by pixel by for example differentiation of second order.

Figure 8C:
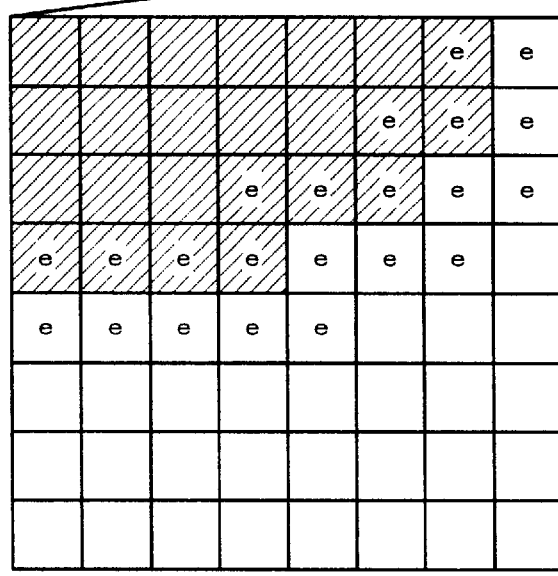

FIG. 8C is an enlarged view of one block at the right lower corner of FIG. 8B. One block is composed of for example 8×8 pixels. The values of hatched pixels are largely different from the values of non-hatched pixels in horizontal or vertical direction. Thus, by differentiation of second order or the like, a sharp variation of the value is detected as an edge. In FIG. 8C, detected edges are represented as contour pixels e.

Figure 8D:
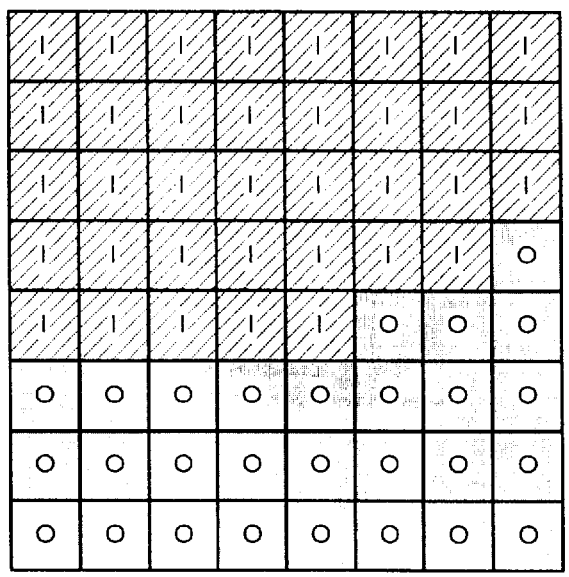

With the boundary of contour pixels, a moving portion with the same moving vector is extracted. As shown in FIG. 8D, inner pixels of a moving portion are denoted by I, whereas outer pixels thereof are denoted by O. Since contour pixels may break, a joining process for the contour pixels may be performed. The memory controller 306 moves an extracted moving portion of the (N−1)-th field corresponding to the addresses of the categorized blocks and the average value of the moving vectors. By extracting the contour and compensating the motion pixel by pixel, the block distortion can be prevented.

When an extracted moving portion is moved and combined with a picture of the (N−1)-th field, a soft switching process may be performed corresponding to contour pixels so that contour of the moving portion becomes smooth. FIGS. 9A and 9B show such weighting coefficients. FIG. 9A shows weighting coefficients assigned to moved blocks in the (N−1)-th field. Contour pixels e of a moved block are assigned weighting coefficient 0.5. Inner pixels of the moved block are assigned weighting coefficients 1. The other pixels are assigned weighting coefficient 0. These weighting coefficients assigned to the individual pixels are multiplied.

FIG. 9B shows weighting coefficients assigned to pixels of an area overlapped with a moved block in the (N−1)-th field. In FIG. 9B, contour pixels e are assigned weighting coefficient 0.5. Pixels corresponding to the inside of the moving portion shown in FIG. 9A are assigned weighting coefficient 0. Thus, after the motion compensating process is performed, the resultant picture inside the moving portion is not affected by the original pixels. On the other hand, pixels corresponding to the outside of the moving portion are assigned weighting coefficient 1. Thus, after the motion compensating process is performed, the resultant picture outside the moving portion is not affected by pixels of the moving block.

When there is no clar contour in blocks, as shown in FIGS. 10A and 10B, at the boundary of contour blocks of a moving portion and outer blocks thereof, a soft switching process may be performed. FIG. 10A shows weighting coefficients assigned to a moved block in the (N−1)-th field. FIG. 10B shows weighting coefficients assigned to pixels overlapped and combined with a moved block in the (N−1)-th field. As shown in FIG. 10A, pixels close to an area of a moving portion are assigned weighting coefficient 1. Pixels more apart from the area of the moving portion are assigned smaller weighting coefficients in the order of 0.75, 0.5, and 0.25.

Assuming that each pixel of a moved block is assigned weighting coefficient k, as shown in FIG. 10B, each pixel in an area overlapped with the moved block is assigned weighting coefficient 1−k. Each pixel adjacent to each pixel assigned weighting coefficient 0.75 is assigned weighting coefficient 1. The soft switching process allows the block distortion to further alleviate. Edges may be detected by other than differentiation of second order.

Next, a noise detecting method using orthogonal transform process such as Hadamard transform process will be described as a second embodiment of the present invention. FIG. 11 is a block diagram showing the structure of the second embodiment of the present invention. As with the noise reducer according to the first embodiment shown in FIG. 3, in the noise reducer according to the second embodiment, a motion adaptive process is performed and a field difference signal is obtained by a subtracting device 404.

The field difference signal is supplied to an Hadamard transform circuit 410. The Hadamard transform circuit 410 performs an Hadamard transform process for dividing the field difference signal into predetermined frequency components. The divided frequency components are supplied to a non-liner circuit 403. The non-linear circuit 403 extracts noise components of the individual frequency bands. A plurality of characteristics corresponding to the frequency components extracted by the non-linear circuit 403 are accomplished by a plurality of memory (ROM or RAM) tables.

The extracted noise components are restored to a signal on the time axis by an inverse-Hadamard transform circuit 411. An output signal of the inverse-Hadamard transform circuit 411 is supplied to a subtracting device 402. The subtracting device 402 subtracts the output signal of the inverse-Hadamard transform circuit 411 from the input picture signal. In such a manner, a field recursive noise reducing circuit is structured. In the example, the Hadamard transform process was described. Instead, another orthogonal transform (for example, DCT) process may be used. Alternatively, with a filter on the time axis rather than the orthogonal transform process, a field difference signal may be divided into frequency components.

A field difference signal received from the subtracting device 404 is divided into a plurality of frequency components. The individual frequency components are processed corresponding to individual characteristics of the non-linear circuit 403. Thus, a noise can be effectively alleviated. For example, due to the fact that a high frequency noise is inconspicuous and a low frequency noise is conspicuous, a process for causing the feedback amount of the field difference signal against high frequency components to become small and the feedback amount of the field difference signal against low frequency components to become large can be performed.

Figure 12:
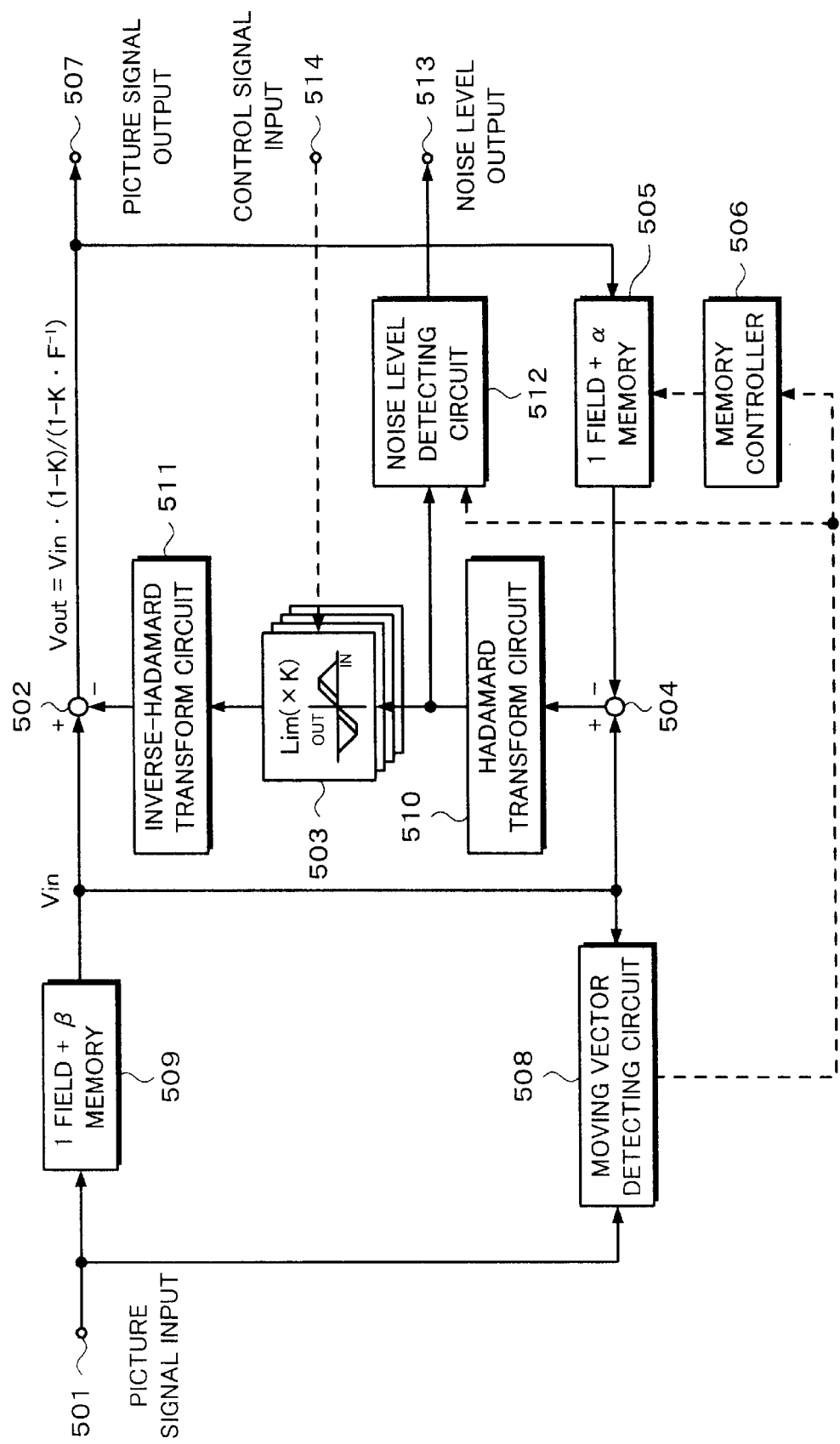
FIG. 12 is a block diagram showing the structure of a noise reducer according to a third embodiment of the present invention.

Next, with reference to FIG. 12, a third embodiment of the present invention will be described. The third embodiment of the present invention is a motion adaptive field recursive noise reducing circuit that automatically measures a noise level and adaptively controls the feedback amount corresponding to the noise level. Field difference signals of individual frequency bands that are received from an Hadamard transform circuit 510 are supplied to a noise level detecting circuit 512. The noise level detecting circuit 512 performs for example an absolute value process for transformed output signals. The resultant output signals (frequency components) are added for a predetermined time period (for example, one field).

The resultant signal is supplied to the controlling circuit 120 (see FIG. 2). The controlling circuit 120 cumulates the added result of each field. Corresponding to the cumulated result, the controlling circuit 120 predicts the average noise level of each frequency band and generates a control signal so that the characteristic corresponding to each frequency component extracted by a non-linear circuit 503 becomes optimum. The control signal is supplied from an input terminal 514 to the non-linear circuit 503. Corresponding to the control signal, the non-linear circuit 503 is controlled.

When the absolute level exceeds a particular threshold level in a noise level detecting circuit 512, it determines that the relevant signal is not a noise and substitutes the absolute value with an adjacent value that does not exceed the threshold value. Thus, the measuring accuracy of the noise level can be improved. When a moving vector detected by a moving vector detecting circuit 508 exceeds a predetermined value (namely, not a still picture), the motion compensating process may not be performed. In this case, since the moving vector exceeds a predetermined search range, the noise level detecting circuit 512 determines that it cannot perform the motion compensating process. In such a case, the address of such a block is supplied to the noise level detecting circuit 512. The noise level detecting circuit 512 substitutes the noise level of the block with an adjacent block having a value that does not exceed the threshold level. Thus, the measuring accuracy of the noise level can be improved.

Next, with reference to FIG. 13, a fourth embodiment of the present invention will be described. The fourth embodiment of the present invention is a motion adaptive field recursive noise reducing circuit that performs a motion compensating process in the accuracy of half pixel. When the motion compensating process is performed in the accuracy of half pixel, an interpolation filter process is performed.

Figure 1:
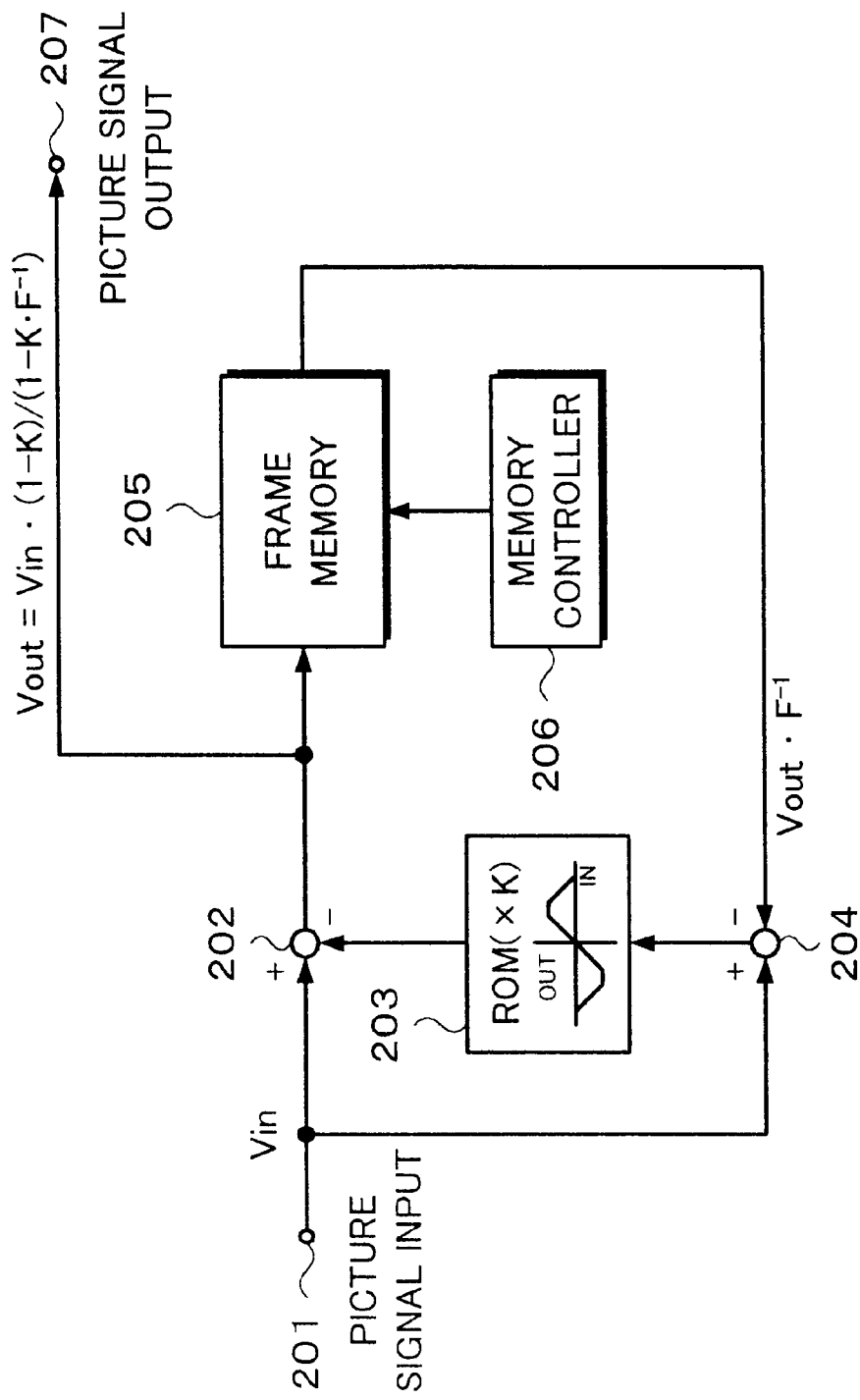
FIG. 1 is a block diagram showing an example of the structure of a recursive noise reducer.
Figure 14:
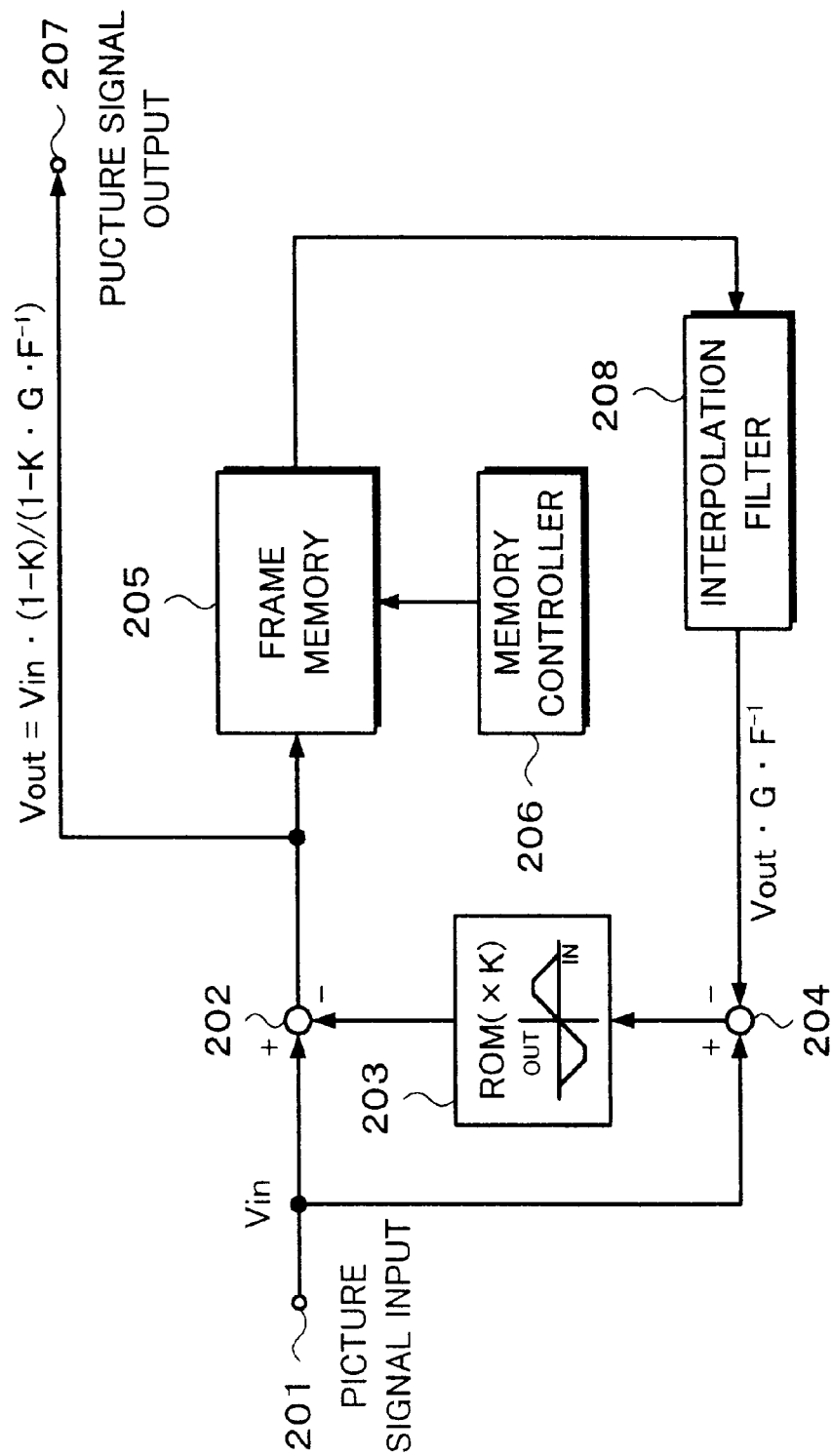
FIG. 14 is a block diagram showing the structure of a noise reducer as a reference for describing the fourth embodiment.

To allow the fourth embodiment to be easily understood, FIG. 14 shows the structure of which an interpolation filter 208 that doubles pixel density is disposed in the above-described field noise reducing circuit (see FIG. 1). In the structure shown in FIG. 14, the interpolation filter process is performed for an output picture signal in a pass band of a non-linear circuit 203. In other words, even if an input picture signal is a still picture, the frequency characteristics deteriorate.

Figure 13:
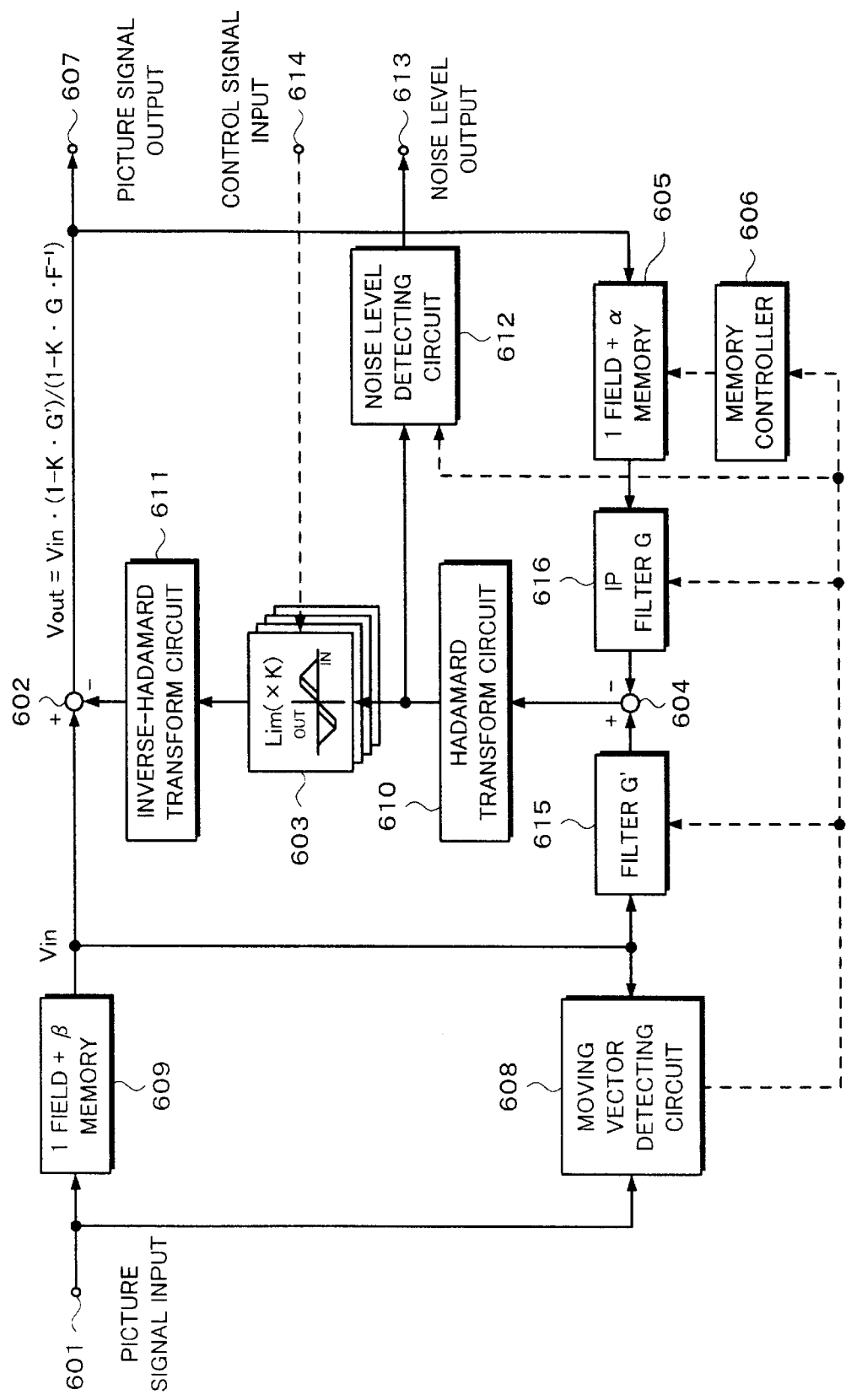
FIG. 13 is a block diagram showing the structure of a noise reducer according to a fourth embodiment of the present invention.

To solve such a problem, in the fourth embodiment shown in FIG. 13, before a subtracting device 604 obtains a field difference, the frequency characteristics are matched. In other words, assuming that the transfer function of an interpolation filter 616 disposed between a field memory 605 and a subtracting device 604 is denoted by G, an input picture signal received from a field memory 609 is supplied to the subtracting device 604 through a filter with transfer function G'.

Thus, in the fourth embodiment, the output video signal Vout can be expressed by the following formula.

$$Vout = Vin - K \cdot (Vin \cdot G' - Vout \cdot F^{-1} \cdot G) = Vin \cdot (1 - K \cdot G')/(1 - K \cdot G \cdot F^{-1}) \quad (2)$$

In the assumption of $G \approx G'$, the deterioration of frequency characteristics due to the interpolation filter 616 can be prevented. In other words, a motion adaptive noise reducing circuit that performs a motion compensating process in the accuracy of half pixel can be accomplished without deterioration of two-dimensional frequency characteristics of an output picture.

Figure 15:
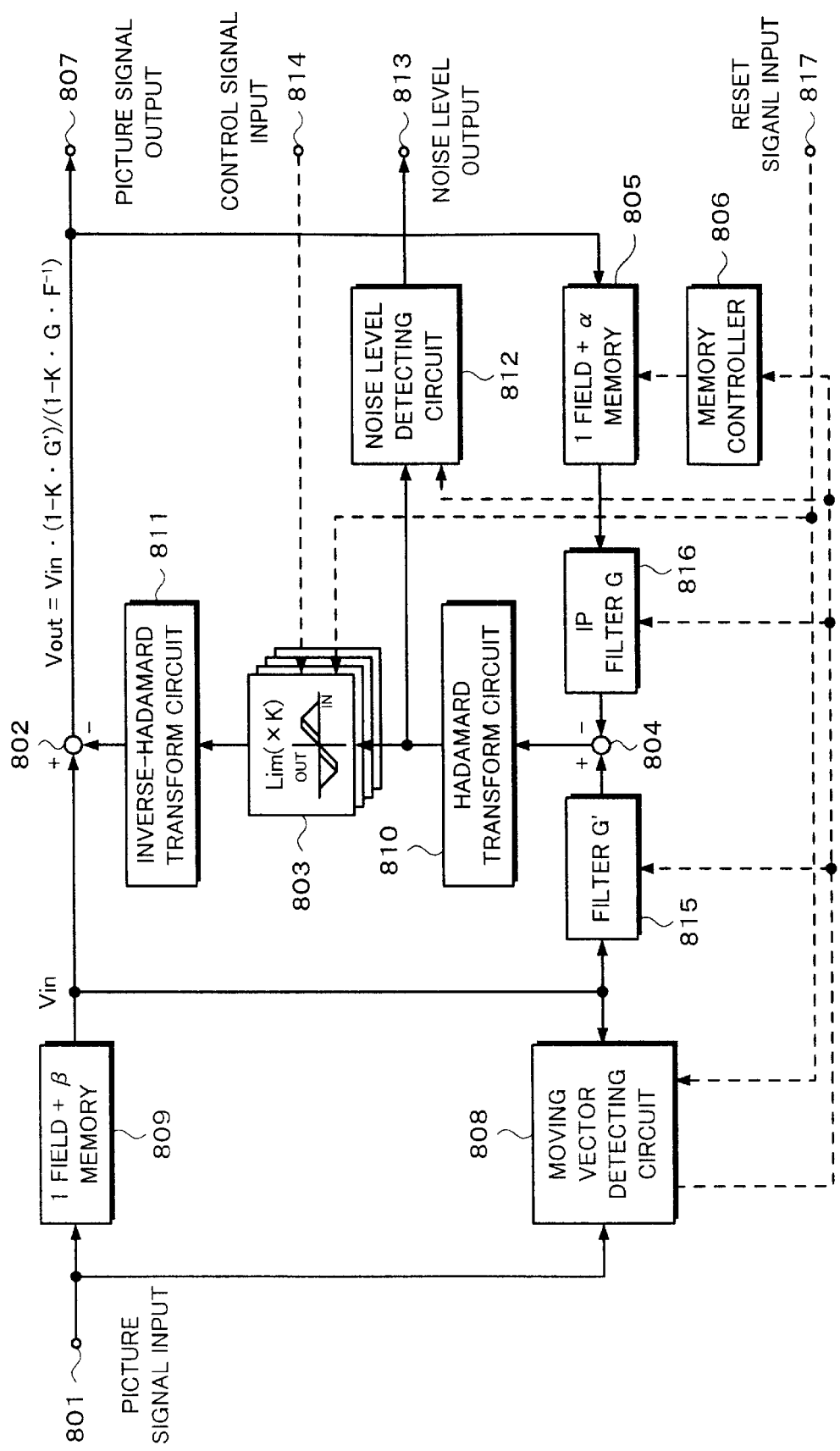
FIG. 15 is a block diagram showing the structure of a noise reducer according to a fifth embodiment of the present invention.

Next, with reference to FIG. 15, a fifth embodiment of the present invention will be described. In the fifth embodiment, when pictures do not correlate between adjacent fields, a motion adaptive field recursive noise reducing circuit is reset. For example, when a channel of a tuner is switched over, the correlation of pictures is lost. In addition, on the same channel, when an audio mode is switched over between stereo mode and monaural mode or between stereo mode and bilingual mode, the correlation of pictures is also lost. Thus, in this embodiment, a switch-over point of channel or audio mode is detected and the motion adaptive field recursive noise reducing circuit is reset.

By detecting the switch-over point of channel or audio mode, the point at which the correlation of pictures is lost is detected. The detected result is supplied to a controlling circuit of a microcomputer or the like. The controlling circuit supplies a reset signal to a terminal 817 shown in FIG. 15 corresponding to the detected result. The reset signal is supplied to a moving vector detecting circuit 808. For example, the moving vector detecting circuit 808 clears a relevant moving vector to 0. The reset signal is also supplied to a non-linear circuit 803. Corresponding to the reset signal, the non-linear circuit 803 sets the feedback coefficient to 0. Thus, the current input picture is stored to a memory 805. Consequently, the input picture is not affected by the preceding picture. In the controlling circuit 120 (see FIG. 2), the reset signal causes the noise level measuring process to be reset. The noise level measuring process is reset after the channel or audio mode is switched over until a stable picture signal is input.

In the above description, when the histogram of moving vectors is calculated, since moving vector information for one screen is used, a memory necessary for a delay of around one field was required. FIG. 16 shows the structure of a sixth embodiment that does not need a delay memory. In this case, a field of which a moving vector is detected is immediately followed by a field of which a motion compensating process is performed using the detected moving vector.

According to the present invention, since a field difference is obtained with a signal that has been motion-compensated, the noise level can be more accurately measured. Thus, the noise reduction effect can be automatically adjusted.

According to the present invention, the motion compensating process is performed for each moving portion that has been extracted. Thus, according to the present invention, moving blur can be more reduced than an apparatus that equally motion-compensates a picture. In addition, since the motion compensating process is performed by extracting the contour of a moving portion (namely, the motion compensating process is not performed block by block), the block distortion of the motion compensating process can be suppressed. Moreover, since an area that newly appears due to a moving portion is processed, an afterimage can be suppressed. When a field memory is used, the memory capacity can be decreased and thereby the apparatus can be structured at low cost.

According to the present invention, an inter-field difference or an inter-frame difference is divided into a plurality of frequency components. The feedback amounts of the individual frequency components are controlled by a non-linear circuit. Thus, a noise can be effectively reduced. In addition, corresponding to a difference signal of each frequency band, the distribution of noise components is predicted. Corresponding to the predicted result, non-linear characteristics are controlled. Thus, the noise reducing process can be performed corresponding to the noise distribution of the input signal.

According to the present invention, since a noise reducing process is performed as a pre-process of a compression encoding process, the encoding efficiency is improved. Thus, a block flicker noise that takes place due to a decoding process can be suppressed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A noise reducer, comprising:

moving vector detecting means for dividing a picture signal into a plurality of blocks and generating an interpolated signal between the adjacent lines of each field to detect moving vectors of the blocks between adjacent fields;

motion compensating means for compensating the motion of a picture of one field prior with the moving vectors;

difference signal obtaining means for obtaining a difference signal between the picture signal and a signal that has been motion-compensated of one field prior;

dividing means for dividing the difference signal into a plurality of frequency component difference signals;

non-linear process means for performing a non-linear process for the individual frequency component difference signals;

combining means for combining the picture signal and the frequency component signals that have been non-linear-processed;

noise level measuring means for measuring an average noise level of the picture signal with the difference signal between the signal that has been motion compensated and the picture signal; and noise reduction effect controlling means for controlling the noise reduction effect corresponding to the average noise level.

2. A noise reducer, comprising:

moving vector detecting means for dividing a picture signal into a plurality of blocks and generating an interpolated signal between the adjacent lines of each field to detect moving vectors of the blocks between adjacent fields;

motion compensating means for compensating the motion of a picture of one field prior with the moving vectors;

difference signal obtaining means for obtaining a difference signal between the picture signal and a signal that has been motion-compensated of one field prior;

dividing means for dividing the difference signal into a plurality of frequency component difference signals;

non-linear process means for performing a non-linear process for the individual frequency component difference signals;

combining means for combining the picture signal and the frequency component signals that have been non-linear-processed; and noise reduction operating means for resetting the noise reduction operation when the correlation of pictures is lost.

3. A picture signal processing apparatus for compression-encoding a picture signal, comprising:

a noise reducer for reducing a noise of a picture signal that has not been compression-encoded, wherein said noise reducer comprises:

moving vector detecting means for dividing a picture signal into a plurality of blocks and generating an interpolated signal between the adjacent lines of each field to detect moving vectors of the blocks between adjacent fields;

motion compensating means for compensating the motion of a picture of one field prior with the moving vectors;

difference signal obtaining means for obtaining a difference signal between the picture signal and a signal that has been motion-compensated of one field prior;

dividing means for dividing the difference signal into a plurality of frequency component difference signals;

non-linear process means for performing a non-linear process for the individual frequency component difference signals;

combining means for combining the picture signal and the frequency component signals that have been non-linear-processed;

noise level measuring means for measuring an average noise level of the picture signal with the difference signal between the signal that has been motion compensated and the picture signal; and noise reduction effect controlling means for controlling the noise reduction effect corresponding to the average noise level.

4. A picture signal processing apparatus for compression-encoding a picture signal, comprising:

a noise reducer for reducing a noise of a picture signal that has not been compression-encoded, wherein said noise reducer comprises:

moving vector detecting means for dividing a picture signal into a plurality of blocks and generating an interpolated signal between the adjacent lines of each field to detect moving vectors of the blocks between adjacent fields;

motion compensating means for compensating the motion of a picture of one field prior with the moving vectors;

difference signal obtaining means for obtaining a difference signal between the picture signal and a signal that has been motion-compensated of one field prior;

dividing means for dividing the difference signal into a plurality of frequency component difference signals;

non-linear process means for performing a non-linear process for the individual frequency component difference signals; and combining means for combining the picture signal and the frequency component signals that have been non-linear-processed; and noise reduction operating means for resetting the noise reduction operation when the correlations of pictures is lost.

* * * * *